United States Patent
Talpe

(10) Patent No.: US 8,333,048 B2
(45) Date of Patent: Dec. 18, 2012

(54) FIXTURE SET

(76) Inventor: Joseph Talpe, Avelgem-Kerkhove (BE)

( * ) Notice: Subject to any disclaimer, the term of this patent is extended or adjusted under 35 U.S.C. 154(b) by 0 days.

(21) Appl. No.: 13/275,831

(22) Filed: Oct. 18, 2011

(65) Prior Publication Data

US 2012/0031037 A1 Feb. 9, 2012

Related U.S. Application Data

(62) Division of application No. 12/832,610, filed on Jul. 8, 2010, now abandoned, which is a division of application No. 11/458,699, filed on Jul. 20, 2006, now Pat. No. 7,780,387.

(30) Foreign Application Priority Data

Jul. 20, 2005 (EP) .................................. 05106649

(51) Int. Cl.
*E04B 1/00* (2006.01)
(52) U.S. Cl. ...................... 52/745.21; 411/34; 411/340
(58) Field of Classification Search .................. 52/698, 52/699, 700, 707, 295, 296, 299, 745.21; 411/34, 340, 35, 28, 49
See application file for complete search history.

(56) References Cited

U.S. PATENT DOCUMENTS

| | | | | |
|---|---|---|---|---|
| 633,537 A | * | 9/1899 | Stewart | 220/235 |
| 670,922 A | * | 3/1901 | Marquardt | 411/34 |
| 716,273 A | * | 12/1902 | Peirce, Jr. | 411/34 |
| 877,118 A | * | 1/1908 | Peiroe | 411/34 |
| 927,064 A | * | 7/1909 | Mower | 411/60.2 |
| 1,049,376 A | | 1/1913 | Le Manquais | |
| 1,153,797 A | | 9/1915 | Kegreisz | |
| 1,161,155 A | * | 11/1915 | Pleister | 411/34 |
| 1,208,999 A | * | 12/1916 | Malaby | 411/34 |
| 1,244,992 A | | 10/1917 | Lee | |
| 1,305,001 A | * | 5/1919 | Ogden | 411/46 |
| 1,933,536 A | | 11/1933 | Awbrey | |
| 1,996,121 A | | 4/1935 | Phillips | |
| 2,143,086 A | | 1/1939 | Pleister | |
| 2,184,783 A | * | 12/1939 | Tinnerman | 411/34 |
| RE22,543 E | * | 9/1944 | Tinnerman | 411/34 |
| 2,542,144 A | | 2/1951 | Kearns | |
| 2,670,021 A | * | 2/1954 | Torresen et al. | 411/34 |
| 2,805,597 A | | 9/1957 | O'Shauhnessy, Jr. | |

(Continued)

FOREIGN PATENT DOCUMENTS

DE 27 54 910 A1 6/1979

(Continued)

*Primary Examiner* — William Gilbert
*Assistant Examiner* — James Ference
(74) *Attorney, Agent, or Firm* — Sughrue Mion, PLLC

(57) ABSTRACT

A fixture set includes an accessory part, and at least one means for fixing the accessory part to a front surface of a wall of a hollow frame, through a hole provided through the wall. The fixing means includes an anchor, a bolt screwed into the anchor and a splitter arranged between the head of the bolt and the anchor. The anchor is entirely inserted in the hole and includes at least two parts which are radially expandable by the splitter, when tightening the bolt, to lock the anchor against the back surface of the wall. The splitter and the anchor include mutually interlockable structures for substantially restricting rotation of the anchor relative to the splitter. The accessory part, or an intermediate accessory piece arranged between the accessory part and the wall, includes a solid connection for substantially restricting rotation of the splitter relative to the accessory part.

5 Claims, 8 Drawing Sheets

U.S. PATENT DOCUMENTS

| | | | |
|---|---|---|---|
| 3,172,603 A | | 3/1965 | Monroe et al. |
| 3,180,203 A | * | 4/1965 | Vaughn .................. 411/34 |
| 3,181,413 A | * | 5/1965 | Wing ..................... 411/34 |
| 3,365,999 A | * | 1/1968 | Perlin .................... 411/34 |
| 3,449,774 A | * | 6/1969 | Wilham .................. 4/240 |
| 3,469,493 A | | 9/1969 | Fisher |
| 3,503,584 A | | 3/1970 | Erhart et al. |
| 3,505,921 A | * | 4/1970 | Wigam .................. 411/34 |
| 3,593,612 A | | 7/1971 | Schulze |
| 3,673,913 A | * | 7/1972 | Barry .................... 411/34 |
| 3,739,683 A | | 6/1973 | Bishop |
| 3,739,684 A | | 6/1973 | Vitkevich |
| 3,890,758 A | | 6/1975 | Bouchard |
| 3,911,782 A | * | 10/1975 | Liebig ................... 411/24 |
| 4,089,496 A | | 5/1978 | Mizusawa |
| 4,143,581 A | | 3/1979 | Smith et al. |
| 4,182,216 A | | 1/1980 | DeCaro |
| 4,208,944 A | * | 6/1980 | Moryl .................... 411/34 |
| 4,221,154 A | * | 9/1980 | McSherry ............... 411/34 |
| 4,283,899 A | | 8/1981 | Wakamiya |
| 4,293,259 A | | 10/1981 | Liebig |
| 4,375,342 A | | 3/1983 | Wollar et al. |
| 4,397,595 A | | 8/1983 | Smith et al. |
| 4,412,407 A | | 11/1983 | Melfi et al. |
| 4,422,222 A | | 12/1983 | Notoya |
| 4,478,542 A | * | 10/1984 | Whelan, Jr. ............ 411/26 |
| 4,491,447 A | | 1/1985 | Smith et al. |
| 4,521,148 A | * | 6/1985 | Tanaka .................. 411/182 |
| 4,530,630 A | | 7/1985 | Brown |
| 4,598,572 A | | 7/1986 | Mondello et al. |
| 4,650,384 A | * | 3/1987 | McIntyre et al. ........ 411/44 |
| 4,770,581 A | * | 9/1988 | Limbrick ............... 411/50 |
| 4,770,583 A | | 9/1988 | Lindberg |
| 4,789,282 A | | 12/1988 | Abraham |
| 4,834,601 A | | 5/1989 | Schaap |
| 4,946,325 A | * | 8/1990 | Abraham ............... 411/24 |
| 5,080,542 A | | 1/1992 | Sheahan |
| 5,120,169 A | | 6/1992 | Russo |
| 5,205,690 A | | 4/1993 | Roth |
| 5,392,573 A | | 2/1995 | Gould |
| 5,546,723 A | | 8/1996 | Jones |
| 5,779,085 A | | 7/1998 | Havlinek et al. |
| 5,813,808 A | | 9/1998 | Wu |
| 5,890,340 A | | 4/1999 | Kafarowski |
| 6,012,886 A | | 1/2000 | Tanamura et al. |
| 6,128,883 A | | 10/2000 | Hatzinikolas |
| 6,345,945 B1 | | 2/2002 | Hildebrandt |
| 6,792,734 B2 | | 9/2004 | Zambelli et al. |
| 7,014,405 B2 | * | 3/2006 | Behle et al. ............ 411/21 |
| 7,661,694 B2 | | 2/2010 | Krespach et al. |
| 2003/0026673 A1 | | 2/2003 | Filipp |
| 2004/0208721 A1 | | 10/2004 | Kuenzel |
| 2004/0208722 A1 | | 10/2004 | Kuenzel |
| 2005/0210771 A1 | | 9/2005 | Kuenzel |
| 2005/0237248 A1 | | 10/2005 | Nakano et al. |

FOREIGN PATENT DOCUMENTS

| | | |
|---|---|---|
| DE | 94 22 153 U1 | 6/1998 |
| DE | 20 2005 019 615 U1 | 4/2006 |
| EP | 1 277 971 A1 | 1/2003 |
| WO | 2004/094840 A2 | 11/2004 |
| WO | 2005/051720 A1 | 6/2005 |

* cited by examiner

FIXTURE SET

This is a Divisional of U.S. patent application Ser. No. 12/832,610, filed Jul. 8, 2010, which a Divisional of U.S. patent application Ser. No. 11/458,699, filed Jul. 20, 2006, the disclosures of all of which are incorporated herein by reference.

The present invention relates to a fixture set comprising an accessory part, and at least one means for fixing the accessory part to a front surface of a wall through a hole provided through said wall. The fixing means comprises an anchor, a bolt screwed into the anchor and a splitter arranged between the head of the bolt and the anchor. The anchor is entirely inserted in the hole in the wall and comprises at least two parts which are radially expandable by the splitter, when tightening the bolt, to lock the anchor against the back surface of the wall. Both the splitter and the anchor comprise mutually interlockable structures for substantially restricting rotation of the anchor relative to the splitter.

The fixture set is especially intended to fix accessories to one of the walls of a hollow frame or more generally to a plate-like wall, the back side of which is not accessible. Fixing accessories to such a wall constitutes a well known problem. The use of mere screws often does not provide sufficient strength to the fixing or requires specific screwing tools, whereas the use of "bolt and nut" fixing systems involves the problem of putting and holding the nut or anchor in place on the back side of the wall.

Fixing devices have been proposed, comprising a threaded bolt and an anchor, the anchor being insertable through a hole in the wall and threaded so as to be screwable to the bolt, whereas special means are provided to expand the anchor and restrict its rotation when screwing the bolt to the anchor, so that the anchor locks against the back surface of the wall.

One such fixing device is disclosed in the first embodiment of German patent application DE 27 54 910 A1. This fixing device comprises a bolt having a bolt head and an at least partially threaded shaft. The bolt is screwed in an anchor which is sized for being completely insertable through a hole in the wall and which comprises radially expandable parts. The fixing device further comprises a splitter which is interposed between the bolt head and the anchor, and which is sized for being partially axially insertable through the hole in the wall. The splitter and the anchor are shaped so as to restrict the rotation of the anchor relative to the splitter and to radially expand the expandable parts of the anchor when said splitter is urged to penetrate in between these parts when tightening the bolt until the free ends of the expandable parts engage the back surface of the wall.

This prior art, however, has the drawback that the splitter needs to be held with a separate suitably shaped spanner to prevent it from rotating with the anchor when the bolt is screwed to the anchor. This could be awkward or even impossible depending on the shape and position of the accessory part to be fixed. Moreover, it is a quite complex job for one person to hold the spanner and at the same time the accessory part while screwing the bolt, usually with an electric screwing tool, into the anchor.

An alternative, disclosed in the second embodiment of DE 27 54 910, and in German utility model DE 94 22 153 U, is to press-fit the splitter into the hole in the wall so as to prevent rotation thereof. In this way, the accessory part can be screwed much more easily by means of the bolts to the pre-installed anchors. However, this alternative has the drawbacks of being able to hold the splitter only against moderate torques and being unsuitable for use on thin or soft walls. If a solid fixation has to be achieved, the expandable parts of the anchor should be made quite robust so that high torques must be exerted onto the bolt to enable to expand the expandable parts of the anchor.

It is the purpose of this invention to provide a fixture set, comprising at least an accessory part and at least one means for fixing the accessory part to the front side of a wall through a hole provided in the wall, said fixing means being of the type comprising a bolt, an anchor and a splitter, wherein the fixture set is easy to fix and wherein an anchor having quite robust expandable parts can be used, even on thin or soft walls without requiring special tools to avoid rotation of the splitter.

To achieve this purpose the fixing device according to the invention is characterised in that it optionally comprises an intermediate accessory piece arranged to be fixed between the accessory part and the front surface of said wall, and the accessory part or the intermediate accessory piece comprises means for substantially restricting rotation of said splitter relative to said accessory part or intermediate accessory piece.

In this way, only the accessory part and optionally the intermediate accessory piece have to be held in place while screwing the bolt into the anchor. Rotation of the splitter and therefore also of the anchor is indeed avoided by the fact that the splitter cannot rotate with respect to the accessory part or the intermediate accessory piece or only over a small angle, for example over an angle smaller than 45°.

The optional intermediate accessory piece is for example in the form of a plate-like piece which is interposed between the back side of the accessory piece and the wall to which the accessory part is to be fixed. The optionally intermediate accessory piece may be fixed, for example by screwing or welding, to the back of the accessory piece so that only the accessory part has to be held against the wall. Even when not fixed to the accessory part, the intermediate accessory piece can be held easily together with the accessory part to the wall, especially when two or more fixing means are provided since these fixing means prevent any rotation of the intermediate accessory piece with respect to the accessory part.

According to at least one embodiment of the invention, said means for substantially restricting rotation comprise a solid connection to the splitter, the splitter preferably being an integral part of the accessory part or of the intermediate accessory piece and in particular formed in one piece with the accessory part or with the intermediate accessory piece. This arrangement not only has the advantage of more reliably restricting rotation of the splitter, but also of reducing the number of parts, simplifying the fixture set.

According to a preferred embodiment of the invention, the hole in the accessory part has a widened inlet opening wherein the bolt head can be accommodated. This has the advantage of allowing a flat, protrusion-free surface on the mounted accessory part.

According to a preferred embodiment of the invention, the bolt is externally threaded and the anchor is internally threaded. This arrangement has the advantage of simplicity, although an alternative embodiment in which the bolt comprises an internally threaded axial bore, and the anchor an externally threaded shaft is also possible.

According to preferred features of the invention, said splitter may comprise at least one rib provided to engage in at least one slit on said anchor to substantially restrict rotation of said anchor and splitter relative to each other.

According to a further preferred feature of the invention, the splitter is a moulded piece, made of a plastic material but preferably of a cast metal such as zamac.

The invention also relates to a method for fixing an accessory part according to the invention to a wall.

The invention will now be described in more detail, in a non limiting way, having reference to the accompanying drawings, in which.

Figure 11:
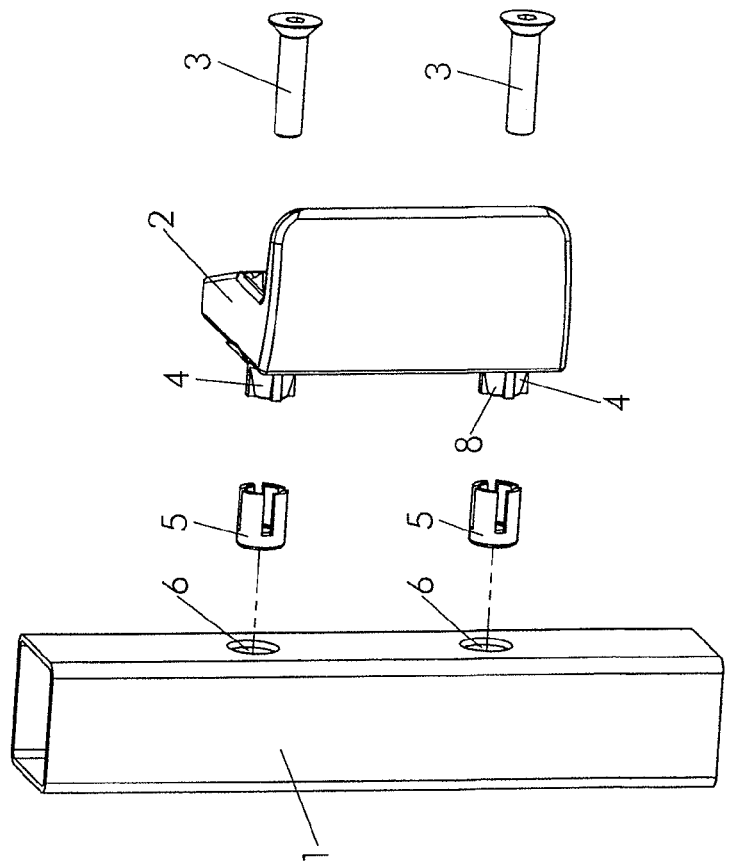
Figure 10:
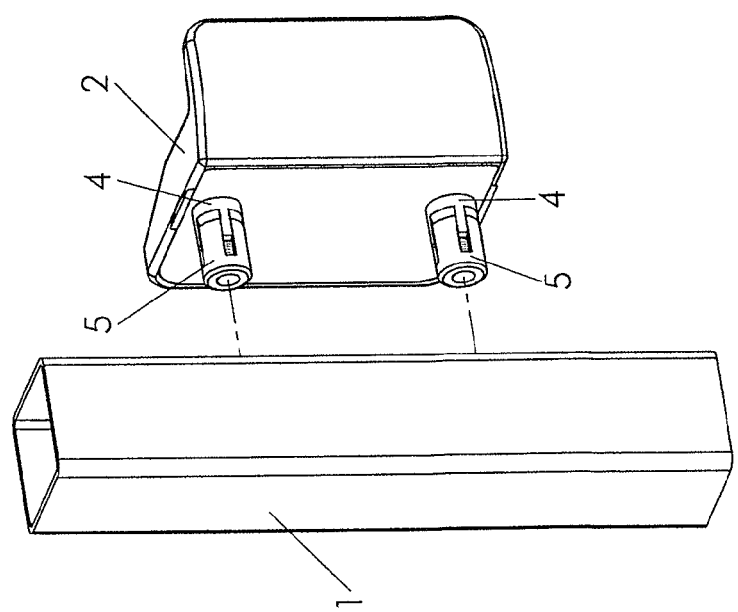
Figure 12:
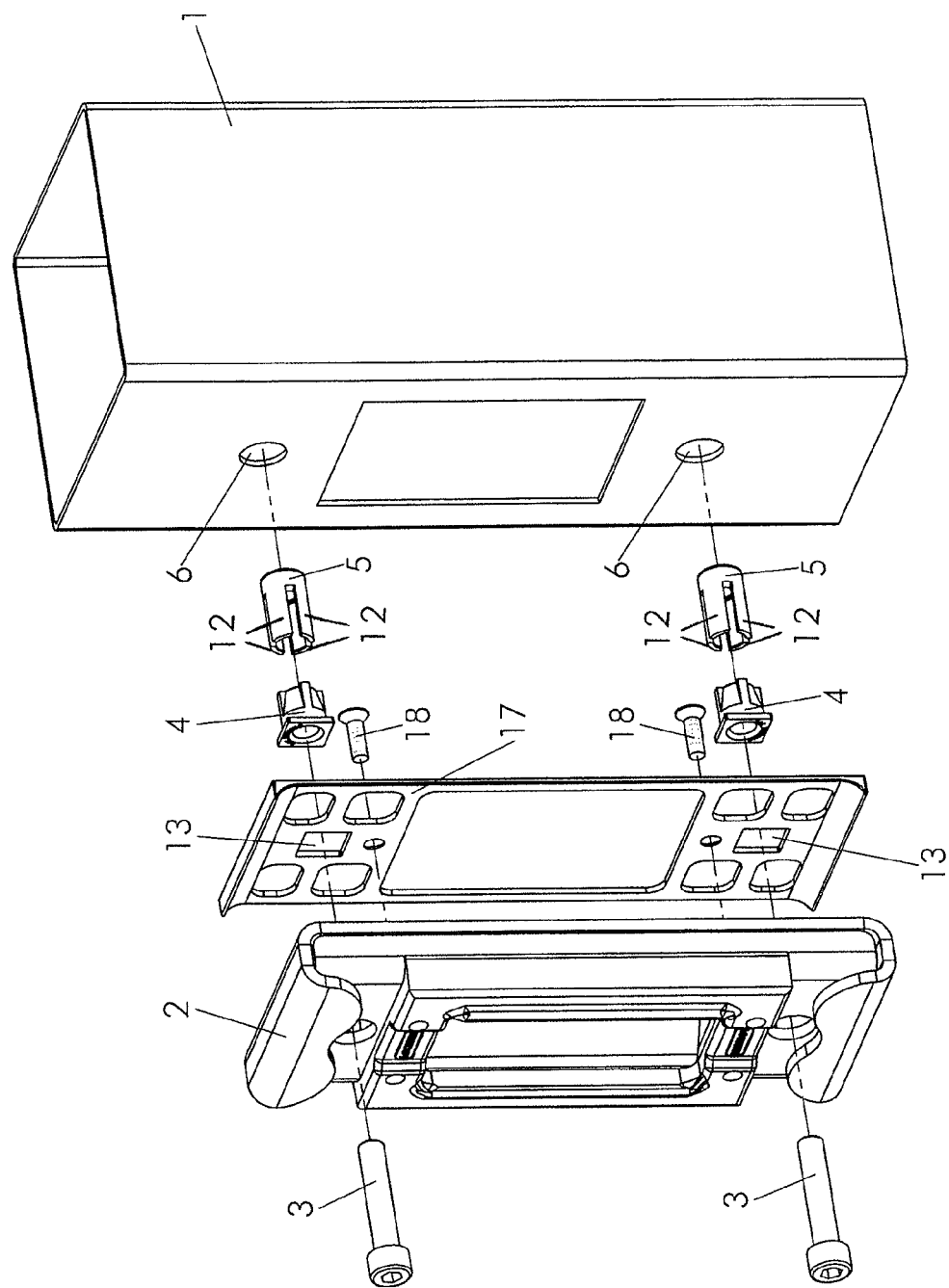

FIGS. 10 and 11 are perspective views of a fixture set according to the invention, in which two splitters are integrally formed in one piece with the accessory part, more particularly a door keeper/lock bolt reception element; and FIG. 12 is an exploded view of a fixture set, comprising a bolt reception element of a sliding door which is to be fixed to the wall of a hollow post, the fixture set comprising an intermediate accessory pieces to be fixed between the accessory part and the post and showing the recesses arranged to receive the heads of the splitters.

Figures 1, 1A:
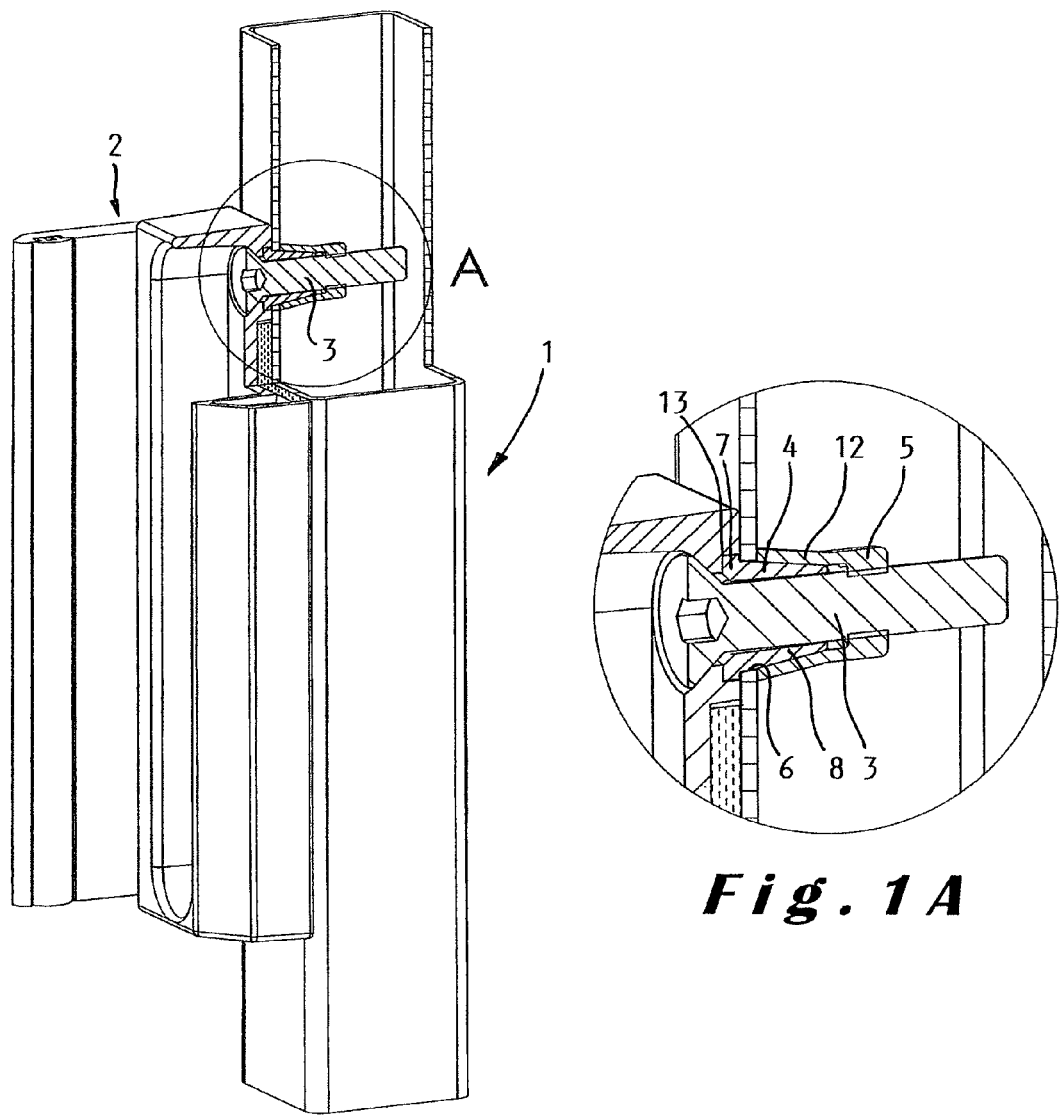
FIGS. 1 and 2 are a perspective view and an exploded view of a fixture set comprising an accessory part, more particularly a door keeper/lock bolt reception element, which is fixed to a wall of a hollow post or frame, FIG. 1A showing a detail view of the fixing device.

FIG. 1 illustrates an example of a fixture set fixed onto a wall of a hollow post or frame 1. This fixture set comprises an accessory part 2, which, in the non limiting example represented in this drawing, consists of a door keeper/bolt reception element, fixed against the front surface of one of the walls of the hollow frame 1. The accessory part 2 is fixed to the hollow frame 1 by means of two fixing means which extend through a hole 6 in said wall. Each of the fixing means comprises a standard externally threaded bolt 3, a splitter 4 (which is in this case a part separate from the accessory part), and an internally threaded anchor 5. As can be seen more clearly in FIG. 1a, the anchor 5, in its expanded position, is held by the bolt 3, by means of the screw thread, against the inside surface of the wall, thus anchoring the whole fixture set.

Figure 2:
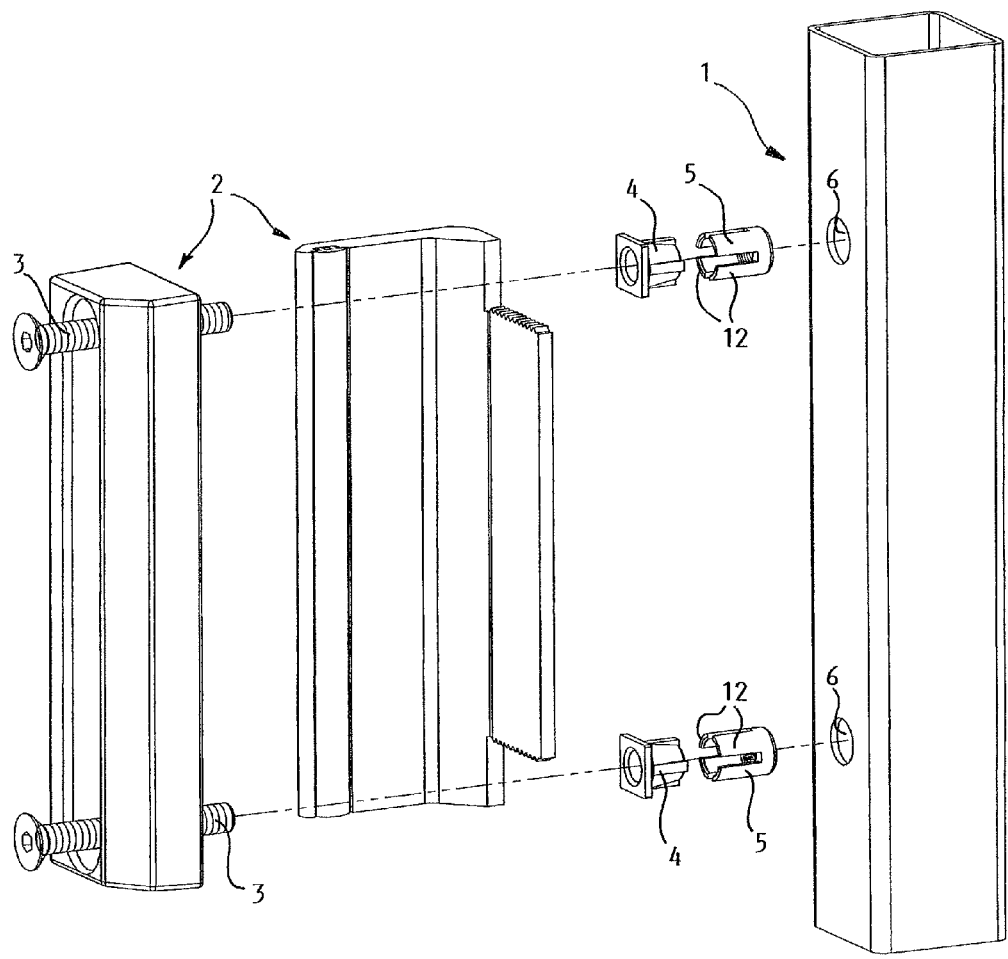
Figure 3A:
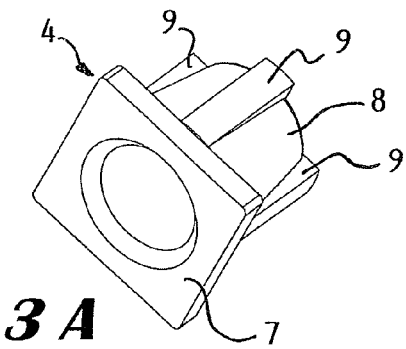
FIGS. 3A and 3B are perspective top and bottom views of the splitter of the fixture set illustrated in FIGS. 1 and 2, which splitter has a square head and conical wedge surfaces with ribs.
Figure 4A:
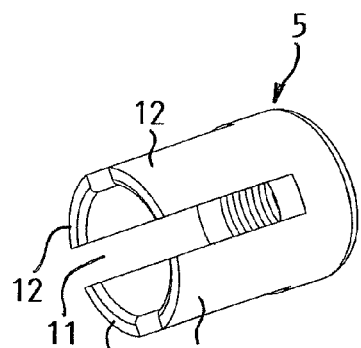
FIGS. 4A and 4B are perspective top and bottom views of the expandable threaded anchor of the fixture set illustrated in FIGS. 1 and 2.
Figure 3B:
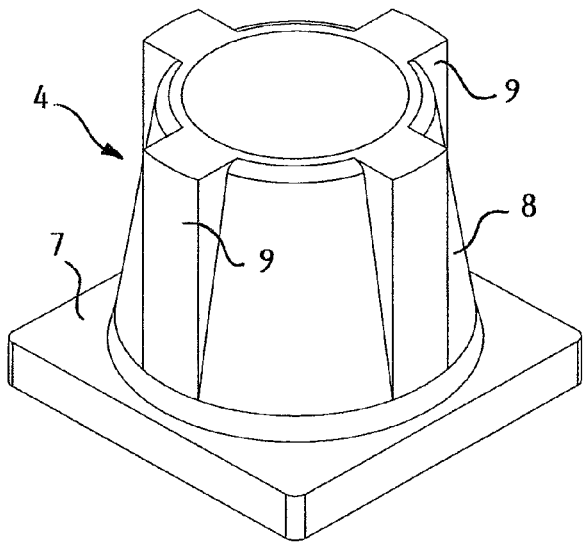
Figure 4B:
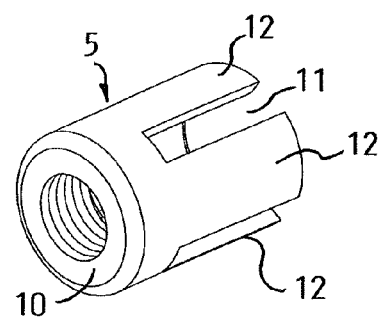

FIG. 2 shows an exploded view of the elements of assembly of FIG. 1, before assembly. The screw threads of the bolt 3 and the anchor 5, which were not shown in the schematic representation of FIG. 1, are visible in the exploded view of FIG. 2. As can also be seen in FIG. 2, the anchors 5, in their unexpanded form, can be inserted in the circular holes 6 drilled in the wall of the hollow frame 1 whilst the splitters 4 can only be partially inserted in these holes 6. The splitter 4 and the anchor 5 are shown in more detail in FIGS. 3A and 3B and in FIGS. 4A and 4B respectively.

The splitter 4 comprises a non circular portion, more particularly a non-circular head 7, in this case square, which is larger than the holes 6 in the hollow frame. The portion of the splitter 4 which is inserted into the hollow frame has conical wedge surfaces 8 separated by ribs 9.

The illustrated anchor 5 globally consists of a hollow cylinder comprising a threaded bottom part 10, with four slits 11 forming parts 12 which can be radially expanded by means of the splitter 4.

The splitter 4 and anchor 5 are shaped so that, when urged against each other, the ribs 9 of the splitter 4 engage the slits 11 of the anchor 5, substantially restricting rotation of the anchor 5 relative to the splitter 4, and the conical wedge surfaces 8 of the splitter 4 force the expandable parts 12 of the anchor 5 outwards, thus expanding the outer diameter of the anchor 5 to a size lager than the diameter of the holes 6 in the hollow frame.

Figure 5:
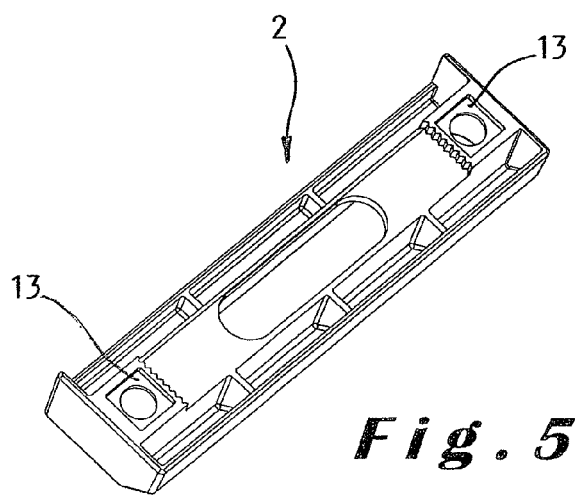
FIG. 5 is a perspective view of the back of the accessory part of the fixture set illustrated in FIGS. 1 and 2, the accessory part having recesses arranged to receive the heads of the splitters of two fixing devices.
Figure 6:
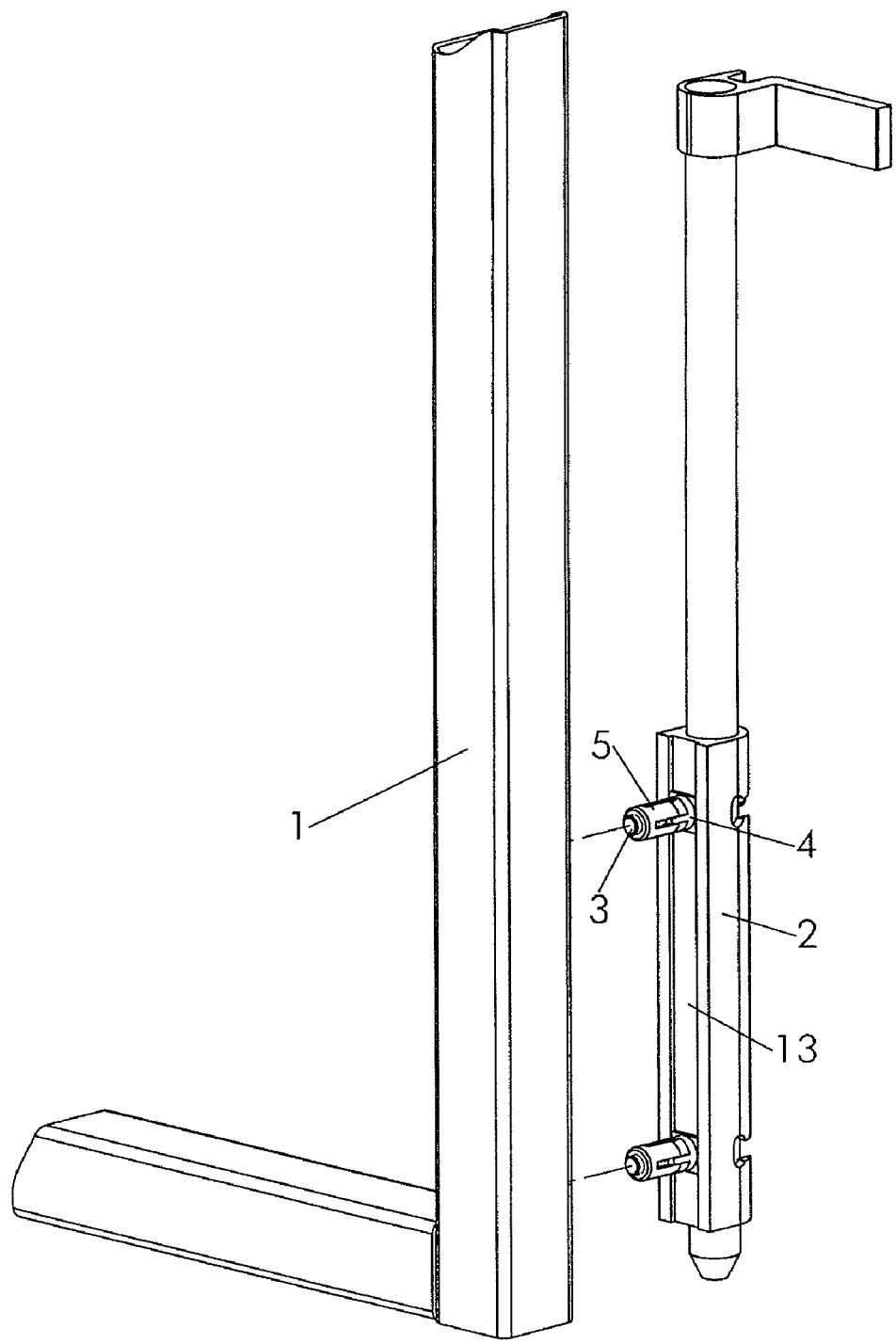
FIG. 6 is an exploded view of a fixture set wherein the accessory part is a bolt which is to be fixed to a gate frame.
Figure 7:
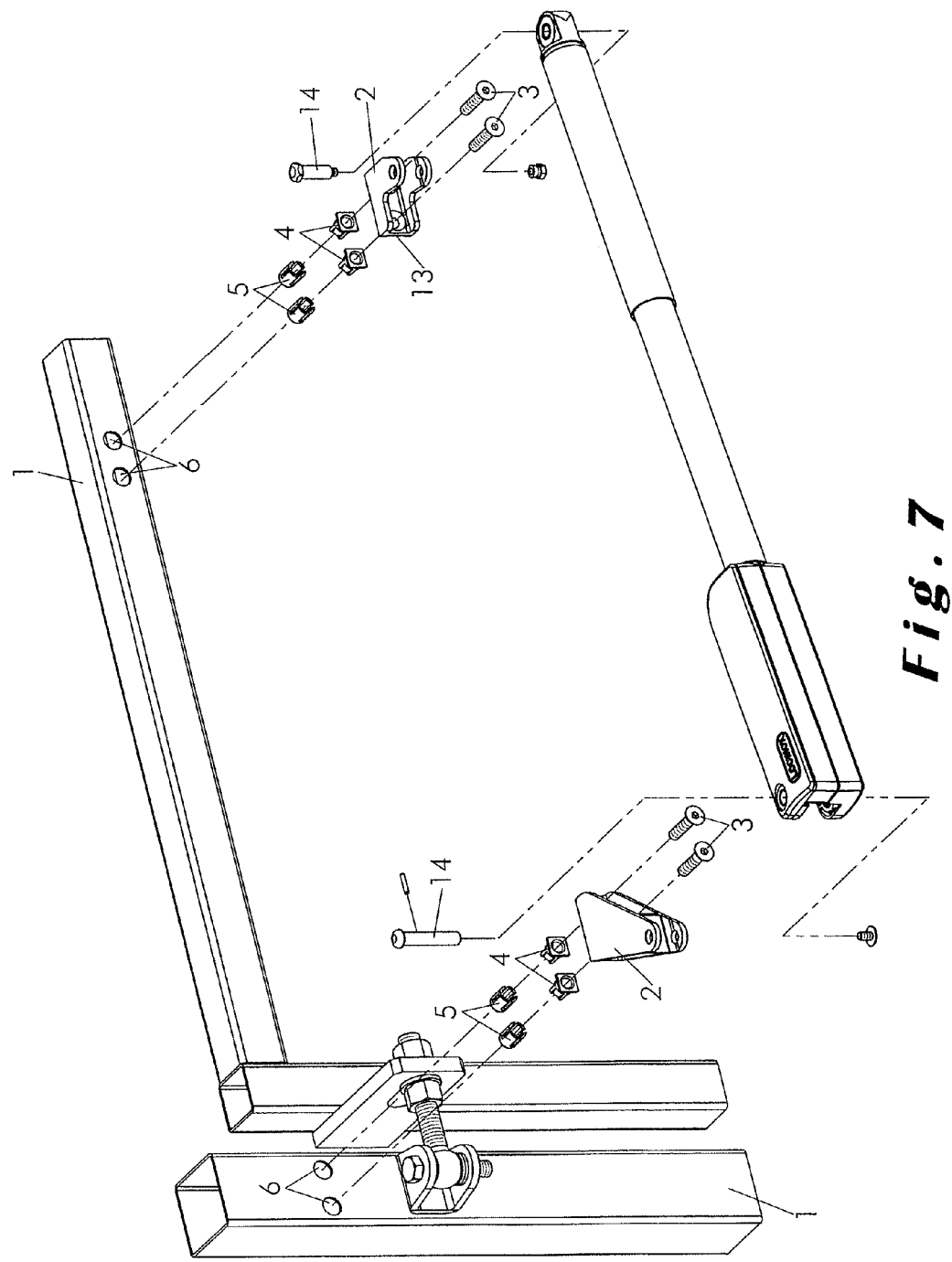
FIG. 7 is an exploded view of a fixture set wherein the accessory parts are hinge parts to be fixed to a hollow post and to a gate frame and used mount a door closer by means of pivots to the gate.

Turning now to FIG. 5, it can be seen that the back side of the accessory part 2 comprises two square recesses 13 arranged to receive the square heads 7 of two splitters 4. When the square splitter heads 7 are inserted into those recesses 13, their form-locking engagement substantially restricts rotation of the splitters 4 relative to the accessory part 2. Although in FIG. 5 the recesses are illustrated as square, any non-circular form that would restrict rotation of the splitter heads 7 could be considered. The non-circular portion of the splitter could also be formed of two or more projections onto the splitter which are received in corresponding recesses in the accessory part. Since there are two or more projections, each of them may even be circular. Moreover, the recess 13 in the accessory part may, for instance, also be formed by a single elongated groove which can accommodate several splitter heads 7 and hold them against rotation. Such an embodiment is illustrated in FIG. 6 wherein the accessory part 2 is a bolt and in FIG. 7 wherein the accessory part 2 is a hinge part used to fix a door closer, by means of pivots 14, to a hollow gate frame 1 and to a hollow gate post 1. It is clear that the hinge parts 2, or similar hinge parts, can also be used to hinge for example the gate itself to the post. An advantage of making the recesses 13 in the form of an elongated groove is that such a groove can easily be obtained when producing the accessory part by an extrusion process.

Figure 9:
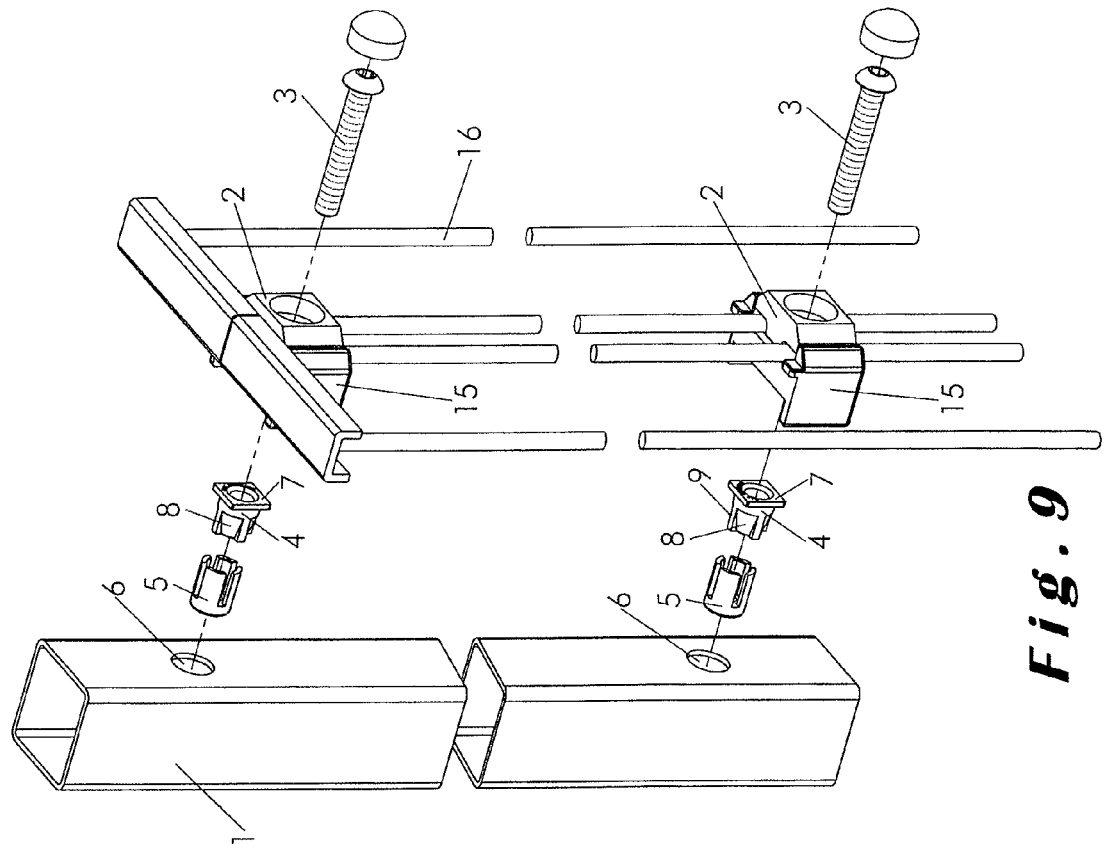
FIGS. 8 and 9 are perspective views of a fixture set wherein the accessory part is a clamp suited for fixing a grill to a hollow post to form a fence.
Figure 8:
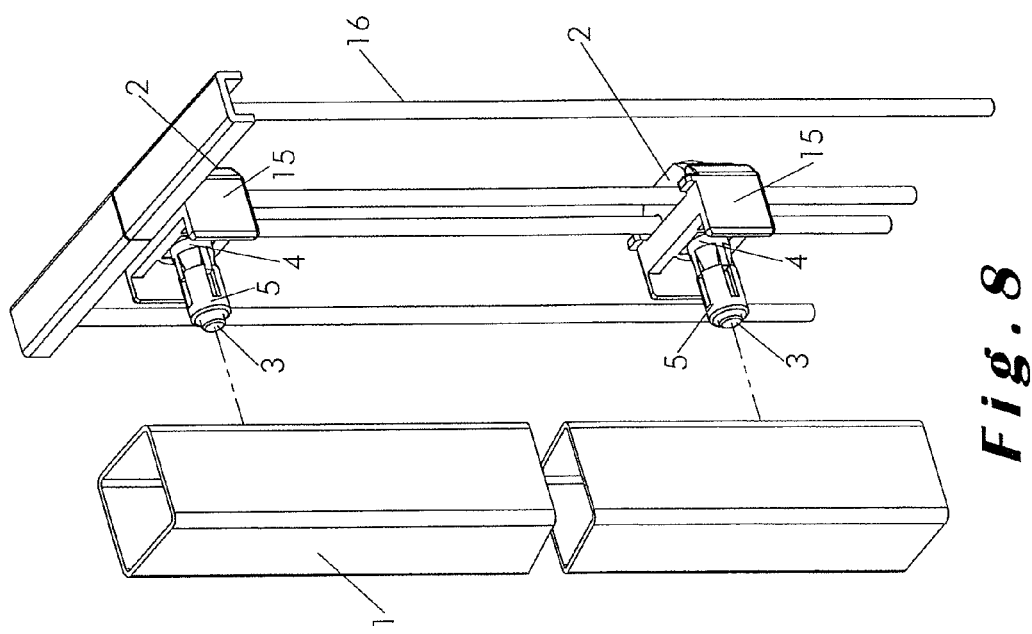

FIGS. 8 and 9 illustrate another fixture set wherein the accessory part 2 comprises a clamp 15 which is to be fixed to hollow fence post and which is arranged to fix grill panels 16 in an aesthetic and very reliable way to the fence posts.

For fixing the accessory part 2 to the hollow frame 1, the bolts 3 are first introduced through holes in the accessory part 2, and then assembled with the splitters 4 and the anchors 5; the square heads 7 of the splitters thereby fit into the square recess 13 or elongated groove of the accessory part 2.

The fixture set comprising the accessory part 2, bolts 3, splitters 4 and anchors 5 is then placed onto the front surface of the wall of the frame 1, with the fixing means introduced through the corresponding holes 6 in the wall.

As may be readily perceived from FIG. 1A, when tightening the bolts 3, the anchors 5 will be held against rotation by their slits 11 in engagement with the ribs 9 of the splitters 4, and the splitters 4 will be themselves held against rotation by the splitter heads 7 in engagement with the recesses 13 of the accessory part 2. As a consequence the radially expandable parts 12 of the anchor 5 will be pushed against the conical wedge surfaces 8 of the splitter 4 and cause these to expand outwards and ultimately tightly fix themselves against the back side of the wall of the hollow frame 1.

Instead of using a form-locking device for restricting rotation of the splitter 4 with respect to the accessory part, it is possible to restrict the rotation of the splitter 4 relative to the accessory part 2 with a solid connection between them. Such an embodiment of the invention is illustrated in FIGS. 8 and 9. In this embodiment two splitters 4 are integrally formed (in one piece) with the accessory part 2. The splitters and the accessory part are more particularly moulded in a die, for example injection moulded from a plastic material or produced by metal casting or forging.

FIG. 12 illustrates another alternative, in which an intermediate accessory piece 17 is fixed by means of two screws 18 to the back side of the actual accessory part 2. This accessory part 2 is a bolt reception element for a sliding door (as described in U.S. Pat. No. 6,931,897) and is made of quite robust steel material. To avoid having to provide recesses in the back side of this accessory part 2, the recesses 13 (more particularly holes) are provided in the intermediate accessory piece 17 which is arranged between the back of the accessory part 2 and the wall of the hollow post 1 to which it is to be fixed. The intermediate accessory piece has edges which coincide with the edges of the accessory part so that it can easily be held together with the accessory part, even if it would not be fixed to the accessory part. Moreover, due to the fact that there are two (or more) fixing means which may be preassembled, the intermediate accessory piece 17 is positioned by these fixing means in the right position with respect of the accessory part, even if it would have a different shape.

In the same way as the accessory part, the intermediate accessory piece may be moulded in a die, in particular of a plastic material or of metal, and the splitters 4 of the fixing means may be solidly connected to the intermediate accessory piece, in particular by forming (more particularly moulding) them in one piece or by fixing the splitters 4 by a welding process or mechanically, for example by means of screws, to the intermediate accessory piece.

For a skilled person it will be clear that the above described embodiments can further be modified without leaving the scope of the invention as defined by the claims.

What is claimed is:

1. A method of fixing an accessory part to a wall through at least one hole provided therein, the wall having a front surface and a back surface, the method comprising the steps of:
   providing a fixture set comprising the accessory part, an optional intermediate accessory piece and fixing means for fixing the accessory part to the front surface of the wall, the fixing means comprising:
      a bolt having a bolt head and an at least partially threaded bolt shaft;
      a threaded anchor attachable to the at least partially threaded bolt shaft, the anchor comprising at least two radially expandable parts having a free end; and
      a splitter comprising an opening arranged to receive the at least partially threaded bolt shaft, the splitter being arranged to provide at least one wedge surface for radially expanding the at least two radially expandable parts of the anchor, the splitter and anchor further comprising mutually interlockable structures for substantially restricting rotation of the anchor relative to the splitter;
   inserting the at least partially threaded bolt shaft through a hole formed in the accessory part and into the opening in the splitter;
   mounting the anchor to the bolt shaft with the splitter interposed between the bolt head and the anchor;
   axially inserting the anchor completely through the hole formed in the wall;
   at least partially axially inserting the splitter into the hole formed in the wall;
   placing the accessory part against the front surface of the wall; and
   tightening the bolt by screwing the bolt shaft into the anchor;
   wherein the step of tightening the bolt comprises:
      substantially restricting rotation of the anchor relative to the splitter by means of the mutually interlockable structures as the bolt is tightened within the anchor;
      restricting rotation of the splitter by providing a solid connection between the accessory part or the optional intermediate accessory piece and the splitter;
      urging the splitter to penetrate the anchor between the at least two radially expandable parts thereof;
      expanding the at least two radially expandable parts of the anchor using the at least one wedge surface on the splitter until the expandable parts are at least partially expanded; and
      locking the anchor against the back surface of the wall due to engagement of the free ends of the expanded anchor parts with the back surface of the wall.

2. A method according to claim 1, wherein the step of providing the solid connection between the accessory part or the intermediate accessory piece comprises forming the accessory part or the intermediate accessory piece in one piece with the splitter.

3. A method according to claim 1, wherein the step of providing the solid connection between the accessory part or the optional intermediate accessory piece comprises welding the splitter to the accessory part or the optional intermediate accessory piece.

4. A method according to claim 1, wherein the step of providing the solid connection between the accessory part or the optional intermediate accessory piece comprises fixing the splitter to the accessory part or the optional intermediate accessory piece using screws.

5. A method of fixing an accessory part to a wall of a hollow frame in which at least one hole is provided, the wall of the hollow frame having a front surface and an inside surface, the method comprising the steps of:
   providing a fixture set comprising the accessory part, an optional intermediate accessory piece and fixing means for fixing the accessory part to the front surface of the wall, the fixing means comprising:—
      a bolt having a bolt head and an at least partially threaded bolt shaft;
      a threaded anchor attachable to the at least partially threaded bolt shaft, the anchor comprising at least two radially expandable parts having a free end; and
      a splitter comprising an opening arranged to receive the at least partially threaded bolt shaft, the splitter being arranged to provide at least one wedge surface for radially expanding the at least two radially expandable parts of the anchor, the splitter and anchor further comprising mutually interlockable structures for substantially restricting rotation of the anchor relative to the splitter;
   inserting the at least partially threaded bolt shaft through a hole formed in the accessory part and into the opening in the splitter;
   mounting the anchor to the bolt shaft with the splitter interposed between the bolt head and the anchor;
   axially inserting the anchor completely through the hole formed in the wall;
   at least partially axially inserting the splitter into the hole formed in the wall;
   placing the accessory part against the front surface of the wall; and
   tightening the bolt by screwing the bolt shaft into the anchor;

wherein the step of tightening the bolt comprises:—
substantially restricting rotation of the anchor relative to the splitter by means of the mutually interlockable structures as the bolt is tightened within the anchor;
restricting rotation of the splitter by providing a solid connection between the accessory part or the optional intermediate accessory piece and the splitter;
urging the splitter to penetrate the anchor between the at least two radially expandable parts thereof;
expanding the at least two radially expandable parts of the anchor using the at least one wedge surface on the splitter until the expandable parts are at least partially expanded; and
locking the anchor against the inside surface of the wall due to engagement of the free ends of the expanded anchor parts with the inside surface of the wall.

* * * * *